United States Patent [19]

Larive et al.

[11] 3,815,696

[45] June 11, 1974

[54] SNOWMOBILE BANKING MECHANISM

[76] Inventors: Francis Paul Larive; Calvin Arthur Larive, both of 702 Happy Hollow, Hot Springs, S. Dak.

[22] Filed: Feb. 15, 1973

[21] Appl. No.: 332,632

[52] U.S. Cl. ............... 180/5 R, 180/1 FV, 296/1 S
[51] Int. Cl. ...................... B60f 39/00, B62d 37/02
[58] Field of Search ............... 180/1 FV, 6, 3, 5; 296/1 S

[56] References Cited
UNITED STATES PATENTS

| | | | |
|---|---|---|---|
| 1,888,553 | 11/1932 | Holt | 180/1 FV |
| 2,665,137 | 1/1954 | Kamm | 296/1 S X |
| 2,700,427 | 1/1955 | Schomers | 180/3 R |
| 3,455,594 | 7/1969 | Hall | 296/1 S |

FOREIGN PATENTS OR APPLICATIONS

| | | | |
|---|---|---|---|
| 822,334 | 11/1951 | Germany | 180/1 FV |
| 317,691 | 5/1934 | Italy | 296/1 S |

*Primary Examiner*—Richard J. Johnson
*Attorney, Agent, or Firm*—Schroeder, Siegfried, Ryan & Vidas

[57] ABSTRACT

A snowmobile of the endless tread type is provided with a turning and banking as well as direct run assembly comprising a spoiler joined forwardly of the operator to the chassis of the snowmobile and in positon generally over the front skiis with the spoiler member having aileron portions cooperatively joined to the steering mechanism of the snowmobile for movement in accordance with the steering movement of the skiis. The angle of the spoiler to the horizontal is adjustable to increase or decrease the pressure of the skiis on the snow.

6 Claims, 4 Drawing Figures

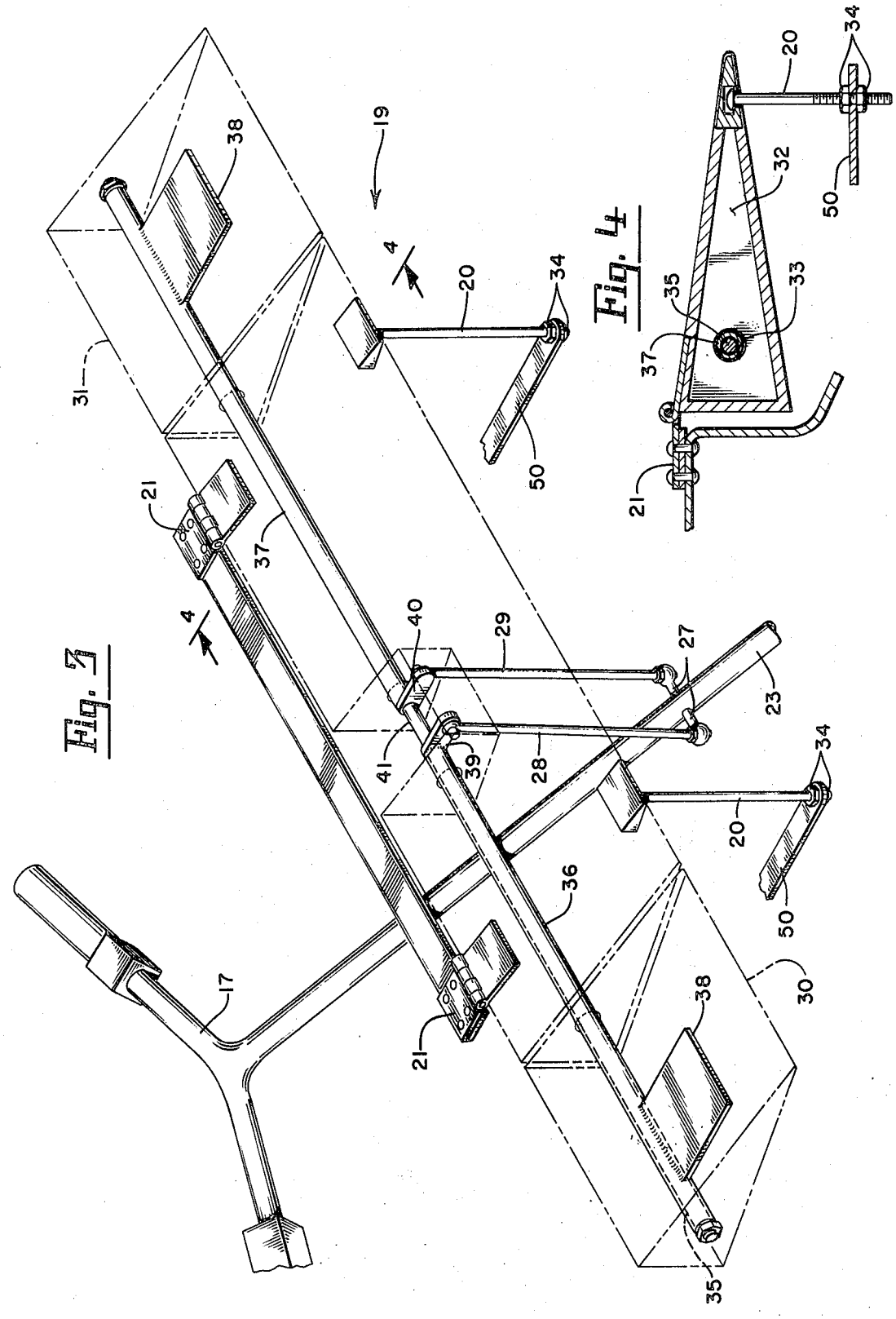

SNOWMOBILE BANKING MECHANISM

The present invention is directed to the art of snowmobiles of the endless tread drive type and is more specifically directed to the modification of such snowmobiles by incorporating a spoiler member across the forward portion thereof. The spoiler member includes a pair of aileron members located at the outer portions of the spoiler to aid in steering the snowmobile around curves. The aileron members are operatively joined to the steering arrangement for the ski portion of the snowmobile so that the ailerons are pivoted in a direction opposite to one another and in such a manner that increased pressure brought about by the drag of the air on the ailerons is applied to the ski on the inside of the turn and a reduction in pressure is accomplished on the ski on the outside of the turn. The attack angle of the spoiler is adjustable so as to permit either increased or reduced pressure contact of the forward skiis on the snow during straightaway as well as during turning operations.

Endless tread driven snowmobiles of the type having a pair of forward skiis for steering have found widespread acceptance throughout the snow belt regions. The skiis at the forward portion of the snowmobile are utilized in the steering operation in conjunction with the shifting of weight on the snowmobile body by the operator and his passengers to bring about a greater bearing of load on the ski on the inside of the turn.

In accordance with the present invention improved steerability is imparted to a snowmobile by the use of a combined spoiler and aileron configuration mounted forward of the operator over the front skiis. A simple construction is provided which allows snowmobiles that have already been manufactured to be suitably modified with a minimum change in the original machine. For original equipment manufacture the simplicity of the construction makes for an inexpensive modification that is readily compatible with previous design.

The invention will be best understood from the following drawings wherein the same numerical designation is used in the several views where like parts appear.

IN THE DRAWINGS

FIG. 3 is a perspective view with the upper skin cut away of the spoiler and aileron construction in accordance with the invention; and FIG. 4 is a sectional view along lines 4-4 of FIG. 3.

Figure 1:
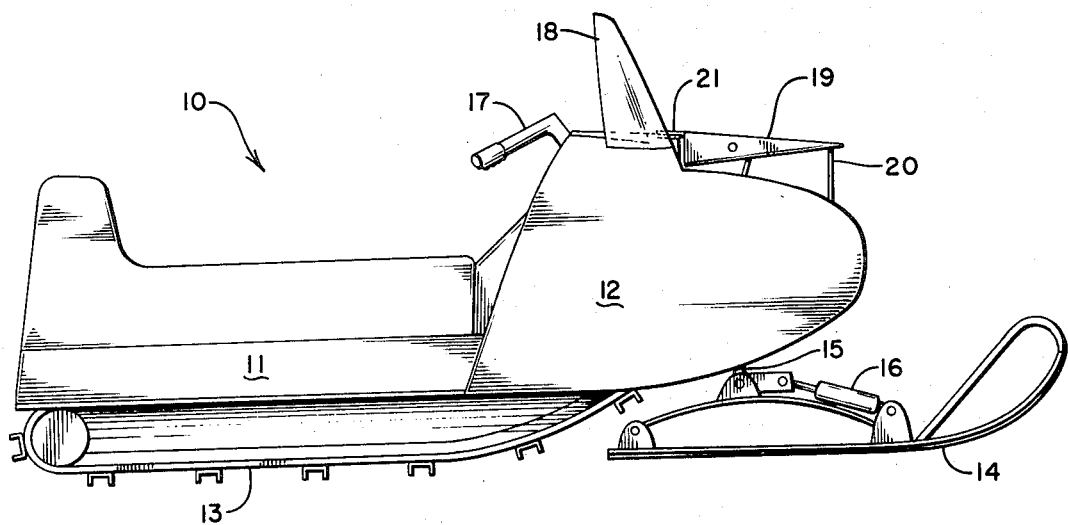
FIG. 1 is a side elevational view of a common type of snowmobile of the endless tread variety modified to include the invention.

Referring first to FIG. 1 there is illustrated a snowmobile generally designated 10 of the common endless tread type. The snowmobile includes a rear chassis 11 and a forward chassis portion 12. The rear chassis 11 is supported on and the entire snowmobile is driven by an endless tread 13 of a conventional type such as described in the Swenson et al patent 3,485,312. As the operation of this type of snowmobile is well known it will not be further described herein.

The forward chassis portion 12 includes a pair of ski members 14 which are pivotally joined to the chassis 12 by mounting means 15. The skiis may include shock absorbers 16 to improve the performance of the machine. The skiis 14 are connected via a rotatable shaft to a handlebar steering assembly 17. The steering assembly and its connection with the ski members is more clearly illustrated in FIG. 2 and is of a well known arrangement. Atop the forward portion of chassis 12 is a windshield 18.

In accordance with the present invention there is mounted to chassis 12 at the portion just forward of windshield 18 a spoiler generally designated 19. The spoiler 19 is mounted at the rear portion thereof by means of a hinge assembly 21 to the chassis 12 and is adjustably joined at a more forward portion of the snowmobile by means of rods 20 which are provided with adjusting means so as to make possible a change in the angle of attack of the overall spoiler. That is, if spoiler 19 is tilted upwardly at the forward portion thereof by means of adjusting rod 20 a lifting action takes place on the forward portion of the machine tending to reduce the amount of drag created by skiis 14. Conversely, the tilting of spoiler 19 in a more downwardly direction has the opposite effect.

Figure 2:
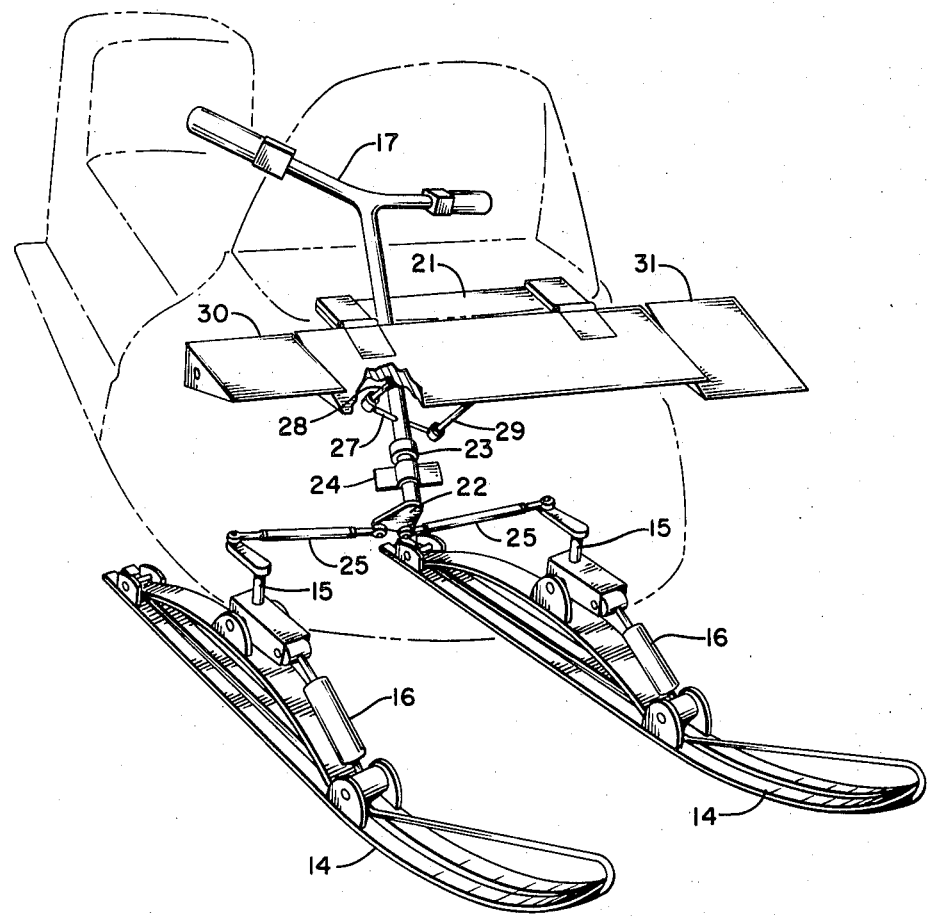
FIG. 2 is a perspective view of a steering assembly including the skiis with a spoiler in accordance with the invention joined thereto.

Referring now to FIGS. 2 and 3 there is shown in perspective and schematic manner a steering assembly of the snowmobile of FIG. 1 and its cooperative action with spoiler 19. A steering post 23 has joined to the upper end thereof handlebars 17 and has located at the lower end thereof a flange 22. The steering post is rotatably joined to the frame (not shown) by means of a clamp 24. Extending from flange 22 are a pair of tie rods 25 which are joined by means of spindles 26 to the shaft controlling the direction of skiis 14. Skiis 14 are rotatably mounted through the base of chassis 12 by an assembly 15 of the conventional type.

Extending through shaft 23 is a rod member 27 which is fixedly joined to shaft 23 by welding or the like. Extending upwardly from each end of rod 27 are tie rods 28 and 29 which are operatively joined by an assembly which will be described below to control the direction of angle of aileron members 30 and 31 respectively. It will be seen from FIG. 2 that as the operator turns handlebar member 17 to the left skiis 14 will likewise be turned to the left. During such a motion the tie rod members 28 and 29 will be pivoted so as to raise aileron 30 and lower aileron 31. The pressure of air against ailerons 30 and 31 will be such as to shift increased load onto the ski on the left and decrease the loading on the ski to the right. Conversely, if the operator turns to the right the increased loading will be on the right ski and the decreased loading on the left ski.

The manner in which this is accomplished is best seen in FIGS. 3 and 4. For the sake of clarity the skiis and the balance of the chassis of the snowmobile have been omitted from the figures. As seen in FIG. 4 the spoiler has a generally triangular cross section with the forward leading edge thereof being the apex of the triangle. It may be formed of a variety of materials although for the sake of appearance and cost it is most desirably formed of high impact plastic. The spoiler is formed having a plurality of rib members 32 which have openings 33 extending therethrough in axial alignment with adjacent ribs. Openings 33 may be suitably provided with a sleeve member to operate as a journal for the control mechanism. The central rear portion of spoiler 19 is joined to the main chassis 12 of the snowmobile by means of hinges 21. At the forward edge of spoiler 19 there is provided a pair of angle adjust and support members 20. Member 20 consists of a threaded rod which is joined to the leading edge of spoiler 20 and extends downwardly through an opening in a strap member 50 attached to the frame of the snowmobile. Nut members 34 are provided to permit the bolt member 20 to be raised or lowered and correspondingly raise and lower the angle that spoiler member 20 has with respect to the ground. The purpose of changing this angle (the attack angle) has already been described.

A continuous steel rod 35 extends from the extreme ends through the length of the spoiler including the aileron assemblies 30 and 31. Suitable means may be provided such as a threaded nut and washer arrangement on the opposite ends of rod 35 to hold the assembly together. Tubular members 36 and 37 respectively are rotatably extended through openings 33 and rib members 32 and around continuous rod 35. At the outer extremities of members 36 and 37 tubes are joined as by means of a flange 38 to the right and left aileron members respectively so that rotation of tube 36 or tube 37 will bring about corresponding rotation of the aileron members 30 and 31. Tube 36 is joined to an operating spindle arm 39 and tube 37 is joined to a spindle arm 40. A spacer or spreader member 41 holds the two spindle arms 39 and 40 in spaced relationship to one another. Spindle arms 39 and 40 are respectively joined by means of tie rods 28 and 29 to rod 27. Suitable mounting ends are provided at each end of tie rods 28 and 29 for joining to spindle arms 39 and 40 and rod 27 to permit some pivotal action as steering column 21 is rotated. Various types of universal joint couplings can be utilized for the purpose.

It can now be seen that as handlebar members 17 are turned to the right that steering post 21 brings about a right turning of the skiis. Simultaneously, rod 27 is rotated and brings about a pivotal downward motion of spindle arm 39 and an upward motion of spindle 40. The downward turning of spindle arm 39 results in flipper member 30 being turned in the downward mode as shown in FIG. 2 with aileron member 31 being tilted upwardly. In a left turn motion of handlebar members 17 the opposite motion of the ailerons takes place.

Thus the purposes of the invention have been accomplished through a relatively simple construction which readily lends itself to modification of already existing machines or to inclusion in newly manufactured machines. While not wishing to be restricted to any specific sizes for spoiler member 19 and its ailerson it has generally been found that the overall width of the spoiler including the aileron portion should not exceed about 40 inches in width. Generally it will be desirable to have the spoiler including the ailerons extend only as wide as or to a slight degree wider than the snowmobile. This will diminish any likelihood of the ends of the spoiler catching on other objects as the snowmobile is being operated. The forward to back distance of the spoiler is likewise variable in accordance with the size and weight of the machine involved. Generally the spoiler will not exceed about one foot in width with a nominal width of about nine inches. The aileron portions may likewise be varied as to the overall percentage that they occupy of the total width of the spoiler. This will depend upon the characteristics of the machine that they are used with. For large and heavy machines it will be desirable that the aileron portion occupy a larger total percentage of the width of the spoiler than would be the case with lighter machines. Ordinarily, the aileron portions will be about nine inches in length. These are matters which can be readily provided for by suitably modifying the dimensions.

What is claimed is:

1. In a snowmobile having a chassis supported and powered at the rear portion thereof by an endless tread and and supported at the forward portion by a pair of front mounted steerable ski members, said ski members being operatively joined for steering to a steering column the improvement comprising:
   a. a wing shaped spoiler member joined to and extending transversely across the forward portion of the snowmobile in vertical relationship to at least a portion of said ski members;
   b. aileron members pivotally joined to said spoiler adjacent opposite ends thereof, and,
   c. means operatively connecting each of said ailerons to said steering column for pivotal motion in response therewith and in opposite direction to one another so that the air drag produced on said aileron members will apply increased downward pressure on the ski on the side of the vehicle toward the direction of turn and reduced downward pressure on the ski opposite the direction of turn.

2. A snowmobile in accordance with claim 1 wherein adjustable means join said spoiler to said snowmobile so that the angle of attack of said spoiler may be varied.

3. A snowmobile in accordance with claim 2 wherein said adjustable means includes a hinge means joining the rear edge of said spoiler to the snowmobile, a vertically oriented rod member joined to said spoiler at a forward portion thereof, and means releasably engaging the lower portions of said rod member are mounted to said snowmobile.

4. A snowmobile in accordance with claim 1 wherein said aileron members extend from the front to the rear edge of each end of said spoiler member.

5. A snowmobile in accordance with claim 4 wherein a rod member extends transversely through said spoiler member and into each aileron member, right and left tube means joined to said respective ailerons and in telescoped relationship with said rod member, spindle arms joined to each of said tube means and linkage means joining said spindle arms respectively to opposite sides of said steering column so that rotation of said steering column will rotate said right and left tubes and the corresponding ailerons in opposite directions to one another.

6. A snowmobile in accordance with claim 5 wherein said steering column includes an aileron control rod extending transversely therethrough adjacent a lower end thereof and said linkage means are joined to the outer ends of said aileron control rod.

* * * * *